W. A. RIDDELL.
CAMERA FRONT.
APPLICATION FILED OCT. 15, 1917.
1,294,705.
Patented Feb. 18, 1919.
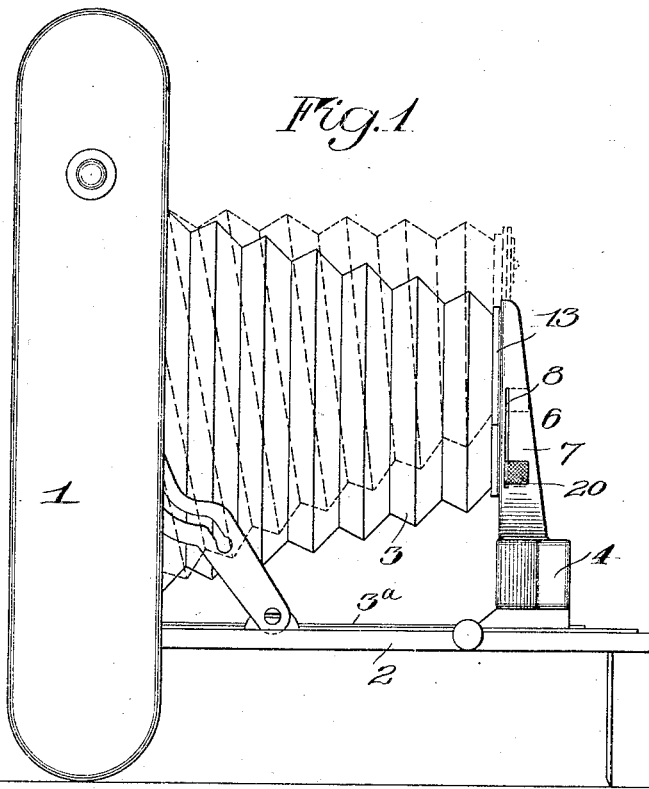
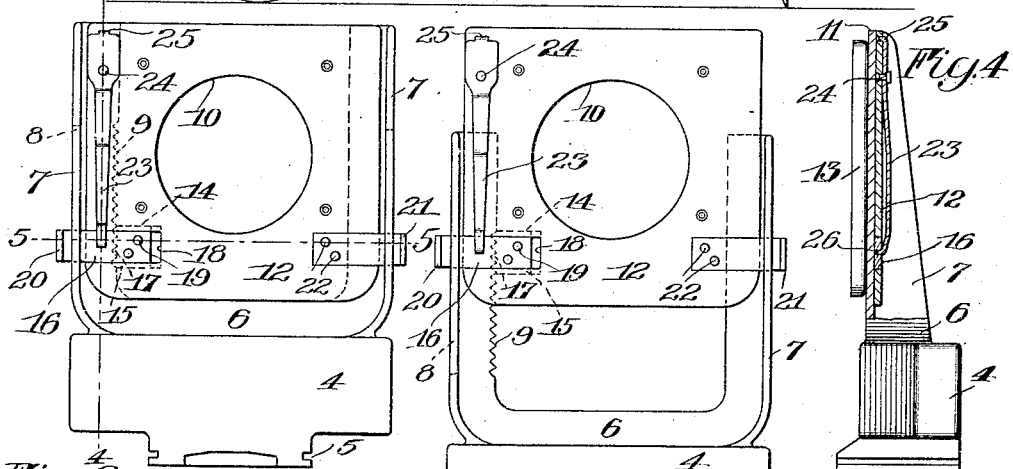
WITNESSES:
Nelson H. Copp
George D. Powell
INVENTOR
William A. Riddell
BY
his ATTORNEYS.

UNITED STATES PATENT OFFICE.

WILLIAM A. RIDDELL, OF ROCHESTER, NEW YORK, ASSIGNOR TO EASTMAN KODAK COMPANY, OF ROCHESTER, NEW YORK, A CORPORATION OF NEW YORK.

CAMERA-FRONT.

1,294,705.

Specification of Letters Patent.  Patented Feb. 18, 1919.

Application filed October 15, 1917. Serial No. 196,564.

*To all whom it may concern:*

Be it known that I, WILLIAM A. RIDDELL, of Rochester, in the county of Monroe and State of New York, have invented certain new and useful Improvements in Camera-Fronts; and I do hereby declare the following to be a full, clear, and exact description of the same, reference being had to the accompanying drawings, forming a part of this specification, and to the reference numerals marked thereon.

My present invention relates to photography and more particularly to folding cameras and it has for its object to improve the construction of the camera front, particularly in relation to the lens board that is adjustably mounted thereon to be raised and lowered and thereby adjust the axis of the lens to different points in the focal plane. The improvements provide a front that is simple, light and cheaply constructed, particular advantage resulting from the ease with which it may be assembled. To these and other ends the invention resides in certain improvements and combinations of parts all as will be hereinafter more fully described, the novel features being pointed out in the claims at the end of the specification.

In the drawings:

Figure 1 is a side elevation of a folding camera constructed in accordance with and illustrating one embodiment of my invention, the camera being in extended position to show the front in side elevation also;

Fig. 2 is a front elevation of the front and its carriage detached with the lens board in lowered position;

Fig. 3 is a similar view showing the lens board in elevated position, the lower portion of the carriage being broken away;

Fig. 4 is a vertical section taken substantially on the line 4—4 of Fig. 2, and

Fig. 5 is a horizontal section taken substantially on the line 5—5 of Fig. 2.

Similar reference numerals throughout the several views indicate the same parts.

The camera in connection with which I have illustrated my present invention is a folding pocket camera of a familiar type comprising a body 1, a bed 2 and a bellows 3, the rear end of the bellows being connected to the body concentrically with the exposure opening for the sensitive material.

On the bed 2 is a track $3^a$ upon which slides a lens carriage 4 constituting part of the camera front and through adjustments of which the focus is obtained. It is notched at 5 to engage the tracks $3^a$ as shown in Fig. 2 and suitable devices are employed for moving the carriage and for locking it in its different positions of adjustment.

Rising from the carriage 4 and preferably formed integrally therewith is a front frame 6 having forwardly turned flanged portions 7 that are slotted at 8 close to the plane of the body of the frame. At one side, the inner portion of the frame is provided with a series of teeth 9 forming a rack. A lens board, the lens opening in which is indicated at 10, is adjustable vertically on the front frame and is composed of three plates: a central body plate 11, a front plate 12 secured thereto and a rear plate 13 likewise suitably fastened to the body plate. The latter occupies the plane of the front frame 6 while the other two plates engage upon the front and rear faces, respectively, of the frame so that the latter constitutes a guide upon which the lens board may slide.

The body plate 11 is slotted or recessed at 14 as shown in dotted lines in Figs. 2 and 3 and in full lines in Fig. 5 to receive the body portion 15 of a sliding bolt 16 that moves in a lateral direction so that teeth 17 thereon may be engaged with or disengaged from the rack 9. The front plate 12 is also slotted at 18 to receive a narrower portion of the bolt 16 than the body portion 14 to which it is secured by the rivets 19 and the bolt being disposed against the plate 13 at the rear, it is confined against other than its intended sliding movement. The portion 16 of the bolt extends through one of the slots 8 terminating exteriorly in a finger-piece 20 while opposed to the latter on the opposite side of the front is a rigid finger-piece 21 set into the plate 12 and secured to the body plate 11 by rivets 22. The bolt 16 is slidably retracted from the rack 9 against the tension of a finger-spring 23 secured to the front face of the front plate 12 by a rivet 24 and an ear 25 struck in from the material of the spring. Its flexible end or point engages in an aperture 26 in the bolt 16.

The rear plate 13, as best shown in Fig.

5, constitutes the bellows frame for securing the front end of the bellows 3 to the front 6 where it is held by a plate 27.

The operation of the device is obvious from the foregoing. To raise or lower the lens board the thumb and finger are pressed against the finger-pieces 20 and 21 which retracts the bolt 16 from engagement with the rack 9. Wherever pressure is released, the bolt finds engagement with the rack under the influence of its spring 23.

A front constructed in accordance with my invention is very easy to manufacture and assemble. The frame 6 and carriage 4 may be formed of an integral casting, the sides of the frame not being connected at the top. The three plates 11, 12 and 13 are easily applied thereto and the addition of the finger-pieces 21 and 20 locks the front and lens board together.

I claim as my invention:

1. The combination with a camera front having guides and a rack and a lens board movable on the guides, of a sliding bolt on the lens board having teeth adapted to coöperate with the rack and terminating in a fingerpiece for withdrawing it from the latter.

2. The combination with a camera front embodying a frame having forwardly turned slotted flanges, an inner portion of the frame being provided with a rack, of a spring actuated bolt on the lens board having teeth adapted to coöperate with the rack and finger-pieces on the lens board projecting laterally through the slots, one of said finger-pieces being on the bolt.

3. The combination with a camera front having guides and a rack and a lens board movable in the guides, of a laterally sliding bolt on the lens board having teeth adapted to coöperate with the rack and a spring finger fixed to a face of the lens board and operatively connected to the bolt to actuate it to engaging position.

4. The combination with a camera front embodying a frame, of a lens board comprising a body plate slidable within the frame and front and back plates secured to the body plate and engaging, respectively, on the front and rear of the frame.

5. The combination with a camera front embodying a frame having a rack formed on one of its inner sides, of a lens board comprising a body plate within the frame, and front and back plates secured to the body plate and engaging, respectively, on the front and rear of the frame, the front plate being provided with a recess forming a guide, of a toothed bolt slidable in the guide to coöperate with the rack on the frame and lock the lens board in adjusted position thereon.

6. The combination with a camera body and a bellows connected thereto at its rear end, of a front embodying a frame, and a lens board comprising a body plate within the frame, a front plate secured thereto and engaging over the front face of the frame and a rear plate secured to the body plate and engaging over the rear face of the frame, said rear plate constituting the bellows frame for securing the front end of the bellows to the lens board.

WILLIAM A. RIDDELL.

Witnesses:
HELEN M. FRASER,
MARGARET DUIGNAN.

Copies of this patent may be obtained for five cents each, by addressing the "Commissioner of Patents, Washington, D. C."